J. W. OGDEN.
Lamp.

No. 212,733.   Patented Feb. 25, 1879.

Witnesses:

Inventor:
Jos. W. Ogden,
per
F. A. Lehmann,
atty

UNITED STATES PATENT OFFICE.

JOSEPH W. OGDEN, OF CHATHAM, NEW JERSEY.

IMPROVEMENT IN LAMPS.

Specification forming part of Letters Patent No. 212,733, dated February 25, 1879; application filed January 30, 1879.

*To all whom it may concern:*

Be it known that I, JOSEPH W. OGDEN, of Chatham, in the county of Morris and State of New Jersey, have invented certain new and useful Improvements in Lamps; and I do hereby declare the following to be a full, clear, and exact description of the invention, such as will enable others skilled in the art to which it pertains to make and use it, reference being had to the accompanying drawings, which form part of this specification.

My invention relates to an improvement in oil-lamps used in lighting streets and other such places; and it consists in placing in the reservoir a perforated vertical cylinder, and in this cylinder is placed a spiral spring, upon the top of which spring is placed a cup or vessel which will hold a sufficient quantity of oil to supply the wick for a certain number of hours. As the oil in this cup or vessel is raised above the rest of the oil and near to the burner a bright steady light will be given until the whole of the oil in the cup is exhausted, when the light will go out of itself without requiring some one to extinguish it, as will be more fully described hereinafter.

Figure 1:
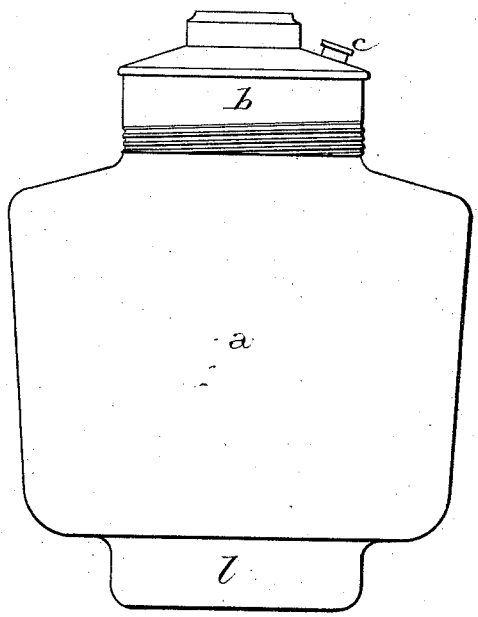
Figure 2:
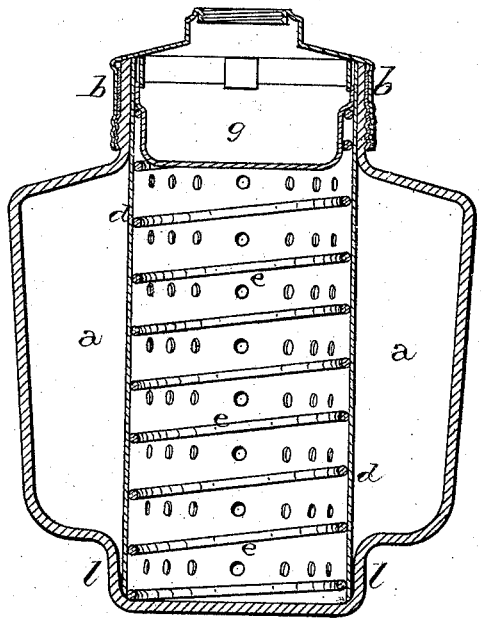

Figure 1 is a side elevation of my invention. Fig. 2 is a vertical section of the same.

$a$ represents a bowl or reservoir, of any suitable size or shape, and which is preferably made of glass, so that the exact quantity of oil in it may always be seen; but any other material may be used.

The form of bowl here shown is especially adapted to lights for streets or other large places where a light is needed for hours, and is preferred to other forms; but the mere form alone does not affect the proper working of the invention. Screwed upon the top of this bowl is the collar $b$, similar to the collars on common lamps, which is provided with a filling-aperture, $c$, and is packed around its lower edge, so as to prevent leakage.

Placed in the center of the bowl is the vertical cylinder $d$, which extends from the bottom of the bowl to its top, and which is perforated all along its sides, so that the oil will flow freely into it from the bowl. The lower end of this cylinder is held in place by a depression or extension in the bottom of the bowl, and its upper end is held by the neck from any lateral play, while the collar prevents it from rising up. Inside of this cylinder is placed a coiled spring, $e$, the lower end of which rests against the bottom of the bowl, while its upper end bears upward against the bottom of a cup or measure, $g$, which can be freely moved up and down in the cylinder. The top edge of this cup reaches almost up against the bottom of the collar, so as to bring its supply of oil close to the burner, and thus always insure a bright light as long as there is any oil left in the cup. This cup is intended to be graduated, so as to hold a quantity of oil that is proportioned to the length of time it is desired the light shall last.

If used on a street-lamp, the cup will hold just enough to burn a prescribed time, when the light will die out of itself without the expense of having some one go around and put it out.

When the lamp is ready to be lighted in the evening, the lighter thrusts a small rod down through the filling-aperture, so as to push the cup down into the oil, and when it is filled, which is almost instantly, the spring at once raises the cup into position, so that the whole lower end of the wick rests in it. He then raises the wick according to the amount of light needed, and lights it.

No matter how full the bowl may be with oil, as soon as the oil in the cup is consumed the light goes out; and no matter how far down into the oil the cup is pushed, only a regulated quantity of oil is raised to the wick.

By having the depression $l$ in the bottom of the bowl, and having the cup made to fit it, when the cup is depressed into this recess, all of the oil from the bottom of the bowl will flow at once into it.

When the bowl is full, or partially so, it is only necessary to depress the cup below the level of the oil; but when the oil is nearly exhausted this recess is very necessary and useful.

Having thus described my invention, I claim—

1. In a lamp, the bowl a, having the aperture c and a guide or cylinder, d, in combination with the cup g and a spring, e, whereby a stick may be passed through the aperture and the cup depressed below the level of the oil, substantially as described.

2. In a lamp, the combination of the outer bowl, a, a guide or cylinder placed therein, a cup for raising the oil to the wick, and a spring or automatic means for raising the cup instantly after it has been depressed, substantially as set forth.

In testimony that I claim the foregoing I have hereunto set my hand this 30th day of January, 1879.

JOS. W. OGDEN.

Witnesses:
 F. A. LEHMANN,
 W. E. BUDD.